United States Patent [19]
Glocker et al.

[11] Patent Number: 5,767,469
[45] Date of Patent: Jun. 16, 1998

[54] NEAR ATMOSPHERIC PRESSURE TREATMENT OF POLYMERS USING HELIUM DISCHARGES

[75] Inventors: David Appler Glocker, West Henrietta; Mark M. Romach, Rochester, both of N.Y.

[73] Assignee: Eastman Kodak Company, Rochester, N.Y.

[21] Appl. No.: 634,999

[22] Filed: Apr. 19, 1996

Related U.S. Application Data

[62] Division of Ser. No. 299,776, Sep. 1, 1994, Pat. No. 5,558,843.

[51] Int. Cl.$^6$ ............................ C07C 1/00; B05D 3/00
[52] U.S. Cl. ............................ 204/157.15; 427/299
[58] Field of Search .................. 204/157, 44, 137.15, 204/477, 478; 422/186.05; 427/299

[56] References Cited

U.S. PATENT DOCUMENTS

| | | | |
|---|---|---|---|
| 3,396,308 | 8/1968 | Whitmore | 317/4 |
| 3,411,908 | 11/1968 | Crawford et al. | 96/74 |
| 3,531,314 | 9/1970 | Kerr et al. | 117/34 |
| 3,582,339 | 6/1971 | Martens et al. | 117/34 |
| 3,607,345 | 9/1971 | Thomas et al. | 117/34 |
| 3,630,742 | 12/1971 | Crawford et al. | 96/87 |
| 3,654,108 | 4/1972 | Smith, Jr. | 204/164 |
| 3,837,886 | 9/1974 | Tatsuta et al. | 117/34 |
| 3,860,427 | 1/1975 | Matsuo et al. | 96/87 |
| 3,874,877 | 4/1975 | Omichi et al. | 96/87 |
| 3,888,753 | 6/1975 | Kiikka et al. | 204/168 |
| 4,051,302 | 9/1977 | Mayama et al. | 428/411 |
| 4,055,685 | 10/1977 | Bayer et al. | 96/87 |
| 4,059,497 | 11/1977 | Kolbe et al. | 204/165 |
| 4,087,575 | 5/1978 | Bichara | 428/1 |
| 4,124,395 | 11/1978 | Ochiai et al. | 96/87 R |
| 4,148,705 | 4/1979 | Battey et al. | 204/192 E |
| 4,209,357 | 6/1980 | Gorin et al. | 156/643 |
| 4,229,523 | 10/1980 | Ohta et al. | 430/532 |
| 4,239,973 | 12/1980 | Kolbe et al. | 250/531 |
| 4,241,169 | 12/1980 | Work, III et al. | 430/532 |
| 4,252,595 | 2/1981 | Yamamoto et al. | 156/345 |

(List continued on next page.)

OTHER PUBLICATIONS

"Proc. Jpn. Symp. Plasma Chem. 2", 1989, pp. 109–112, by A. Nagata, S. Takehiro, H. Sumi, M. Kogama, S. Okazaki, and Y. Horikie.

J. Phys. D: Appl. Phys 23 (1990) pp. 1125–1128, "The Mechanism of the Stabilization of Glow Plasma at Atmospheric Pressure" by T. Yokoyama, M. Kogoma, T. Moriwaki, and S. Okazaki.

"Rapid Communication: Appearance of Stable Glow Discharge in Air, Argon, Oxygen, and Nitrogen at Atmospheric Pressure Using a 50Hz Source", pp. 889–892 by S. Okazaki, M. Kogoma, M. Uehara, and Y. Kimura.

J. Phys. D: Appln. Phys. 23 (1990) pp. 374–377, "The Improvement of the Atmospheric Pressure Glow Plasma Method and the Deposition of Organic Films", by T. Yokoyama M. Kogoma, S. Kanazawa, T. Moriwaki, and S. Okazaki.

Nuclear Instruments and Methods in Physics Research B37/38 (1989) pp. 842–845, "Glow Plasma Treatment at atmospheric Pressure for Surface Modification and Film Deposition" by S. Kanazawa, M. Kogoma, S. Okazaki, and T. Moriwaki.

J. Phys. D: Appln. Phys. 21 (1988) pp. 838–840, "Stable Glow Plasma at Atmospheric Pressure" by S. Kanazawa, M. Kogoma, T. Moriwaki, and S. Okazaki.

*Primary Examiner*—Daniel J. Jenkins
*Attorney, Agent, or Firm*—Arthur H. Rosenstein

[57] ABSTRACT

The present invention is a method and apparatus for treating a polyester support such as polyethylene napthalate or polyethylene terephthalate. The treatment is carried out at near atmospheric pressure in a gas of helium and nitrogen or oxygen. The treatment uses anodized aluminum electrodes and an atmospheric glow discharge results when the electrodes are connected to an RF generator and spaced about 2 mm apart. The process and apparatus improve adhesion of subsequently coated emulsions on the polyester support.

7 Claims, 1 Drawing Sheet

U.S. PATENT DOCUMENTS

| | | | |
|---|---|---|---|
| 4,267,202 | 5/1981 | Nakayama et al. | 427/40 |
| 4,297,162 | 10/1981 | Mundt et al. | 156/643 |
| 4,298,440 | 11/1981 | Hood | 204/165 |
| 4,363,872 | 12/1982 | Ealding | 430/532 |
| 4,394,442 | 7/1983 | Miller | 430/532 |
| 4,429,032 | 1/1984 | Matthe et al. | 432/231 |
| 4,451,497 | 5/1984 | Dolezalek et al. | 427/39 |
| 4,518,681 | 5/1985 | Johnson et al. | 430/532 |
| 4,649,097 | 3/1987 | Tsukada et al. | 430/270 |
| 4,701,403 | 10/1987 | Miller | 430/529 |
| 4,793,975 | 12/1988 | Drage | 422/186.05 |
| 4,993,267 | 2/1991 | Allard et al. | 73/726 |
| 5,004,669 | 4/1991 | Yamada et al. | 430/264 |
| 5,019,117 | 5/1991 | Nakamura et al. | 118/723 |
| 5,022,979 | 6/1991 | Hijikata et al. | 204/298.33 |
| 5,031,571 | 7/1991 | Igarashi et al. | 118/723 |
| 5,136,820 | 8/1992 | Wong et al. | 422/186.05 |
| 5,156,820 | 10/1992 | Wong et al. | 422/186.05 |
| 5,171,369 | 12/1992 | Elwart et al. | 118/723 |
| 5,185,132 | 2/1993 | Horiike et al. | 422/186.05 |
| 5,185,238 | 2/1993 | Oikawa | 430/40 |
| 5,194,291 | 3/1993 | D'Aoust et al. | 148/276 |
| 5,224,441 | 7/1993 | Felts et al. | 118/718 |
| 5,244,780 | 9/1993 | Strobel et al. | 430/535 |
| 5,342,582 | 8/1994 | Horn et al. | 423/105 |
| 5,424,103 | 6/1995 | Ahn | 427/569 |

NEAR ATMOSPHERIC PRESSURE TREATMENT OF POLYMERS USING HELIUM DISCHARGES

This is a Divisional of application Ser. No. 08/299,776, filed 1 Sep., 1994, now U.S. Pat. No. 5,558,843.

FIELD OF THE INVENTION

The present invention is a novel process for treating photographic support with electrical discharges at atmospheric pressure to promote adhesion of subsequent coated layers.

BACKGROUND OF THE INVENTION

Corona discharges are used widely to promote adhesion between various materials. In manufacturing photographic products there is a large body of literature describing various applications of coronas to make aqueous and non-aqueous coatings adhere to various substrate materials. Almost all of these coronas are produced by applying a high voltage (approximately 5–10 kV), relatively high frequency (10 kHz) signal to electrodes in an ambient atmosphere at atmospheric pressure. See for example, U.S. Pat. Nos. 4,241,169; 4,701,403; 4,087,575; 4,429,032; 4,363,872; 4,229,523; 4,394,442; 3,411,908; 3,531,314; 3,582,339; 3,607,345; 3,630,742; 3,860,427; 3,874,877; 3,888,753; 4,055,685; 4,518,681; 5,004,669; French Patent 7613034 and European Patent Application No. 92303556.2. However, there are limitations to the usefulness of corona treatments. Corona treatments produce locally energetic discharges, commonly known as streamers, and these streamers may cause a non-uniform level of treatment. They may also be related to an inhomogeneous loss of red speed in photographic emulsions which produces a mottle defect. Furthermore, corona treatments appear to be effective at promoting adhesions of various coatings to polyethylene but are relatively ineffective at promoting the adhesion of layers to various polyester supports such as polyethylene terephthalate (PET) and polyethylene naphthalate (PEN).

A more controllable and effective way of preparing polymers for coating is with a low pressure glow discharge treatment. Glow discharges are, by nature, very diffuse and homogeneous, producing a more uniform treatment. Moreover, by controlling the gas it is possible to improve the adhesion of photographic layers to materials such as polyesters as well as polyethylene. See for example, U.S. Pat. Nos. 4,993,267; 3,837,886 and 4,451,497. A major disadvantage in glow discharge treatments done at reduced pressures is the problem of maintaining a low pressure at the treatment station. It is necessary to use either a batch process, in which the support is loaded into a treatment chamber and the air is removed, or an in-line process which requires that the support pass through a differential pressure region. In the first case, the support must go through an additional off-line step before coatings are applied. This is unattractive from a product flow perspective and requires additional capital. The second choice is difficult and expensive to implement because of the very tight tolerances needed to maintain the pressure differentials in the transport path. This requires expensive and complicated hardware and pumps. The closer to atmospheric pressure that the treatments can be done, the simpler and less costly the process becomes.

It is known that under certain conditions, stable diffuse glow discharges can be produced at atmospheric pressures. Articles that discuss stable glow discharges are as follows: S. Kanazwa, M. Kogoma, T. Moriwaki and S. Okazaki, *J. Phys. D: Appl. Phys* 21 (1988), pp. 838–840; S. Kanazwa, M. Kogoma, S. Okazaki and T. Moriwaki, *Nuclear Instruments and Methods in Physics Research*, B37/38 (1989) pp. 842–845; T. Yokoyama, M. Kogoma, S. Kanazawa, T. Moriwaki and S. Okazaki, *J. Phys. D: Appl. Phys.* 23 (1990) pp. 374–377; T. Yokoyama, M. Kogoma, T. Moriwaki and So. Okazaki, *J. Phys. D: Appl. Phys.* 23 (1990) pp. 1125–1128 and A. Nagata, S. Takehiro, H. Sumi, M. Kogoma, S. Okazaki, and Y. Horikie, *Proc. Jpn. Symp. Plasma Chem* 2 (1989) pp. 109–112. Work in this area has been limited and directed primarily at etching of photoresist and deposition of materials. These articles indicate that a reliable method of producing diffuse glow discharges at atmospheric pressure is to use helium as the discharge gas. The work reported in the literature has been reproduced and found to be reliable. It has also been found that very small amounts of reactive gases, such as a few percent nitrogen or oxygen, will extinguish an atmospheric helium discharge. However, we have also found that by using trace amounts of reactive gases, stable discharges can be produced at very close to atmospheric pressure which are also able to dramatically improve the adhesion of photographic emulsions to difficult to coat materials such as polyethylene, PET and PEN.

The present invention allows one to treat polymeric surfaces with a stable atmospheric glow discharge so that adhesion of photographic emulsions is improved between the photographic emulsions and the polymeric materials.

SUMMARY OF THE INVENTION

The present invention is a method of treating a polymeric support. The method includes providing a first electrode having a first surface, the first electrode having a plurality of spaced apart holes adjoining the first surface, the first surface being insulated. A second electrode having a second surface is positioned in a spaced apart relationship from the first surface of the first electrode. Gas is pumped through the plurality of holes at a pressure greater than or equal to atmospheric pressure. The gas comprises helium. A power supply is coupled to the first electrode, the power supply has a frequency of between 10 kH to about 50 MHz. A web is positioned between the first surface of the first electrode and the second surface of the second electrode wherein the polymeric web is subjected to atmospheric glow discharge to improve the adhesive properties.

The present invention also includes a device adapted for use in an atmospheric glow discharge chamber which includes an electrode having a first surface, the first surface including a plurality of holes terminating at the first surface, the first surface of the electrode being insulated. A gas is provided to the plurality of holes and a power supply is coupled to the electrode.

The present invention provides the advantage of improving the adhesive properties of a polyester substrate using glow discharge device that operates at atmospheric pressures.

For a better understanding of the present invention together with objects, advantages and capabilities thereof, reference is made to the following detailed description and appended claims.

DETAILED DESCRIPTION OF THE PREFERRED EMBODIMENT

Figure 1:
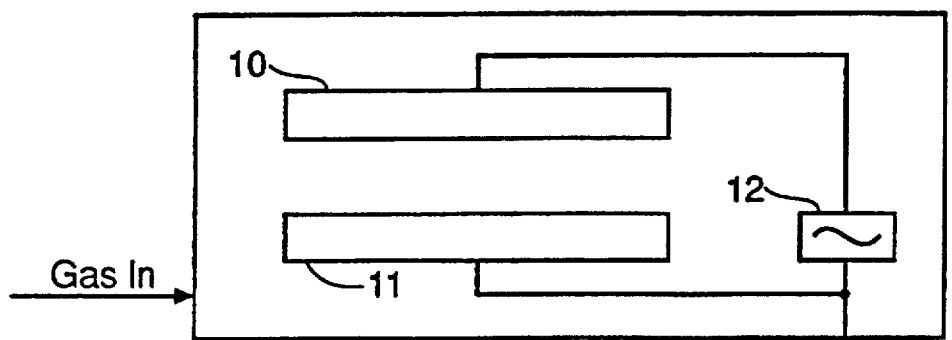
FIG. 1 shows a schematic of a prior art device used to obtain an atmospheric glow discharge.

FIG. 1 illustrates a prior art set-up used to obtain a near atmospheric pressure glow discharge. Two solid square aluminum electrodes 10 and 11, one of which was anodized (electrode 10), were used to treat fully oriented PET and oriented annealed PEN in helium and in mixtures of helium and oxygen or nitrogen. The electrodes 10 and 11 were 7.5 by 7.5 cm and were 2 mm apart. They were powered by an RF generator 12 operating at 13.56 MHz. With a mixture of 0.1% $N_2$ in He by volume, a stable discharge was possible at 600 Torr or below. Greater concentrations of reactive gas (either $N_2$ or $O_2$) further lowered the available operating pressures for stable discharges.

Figure 2:
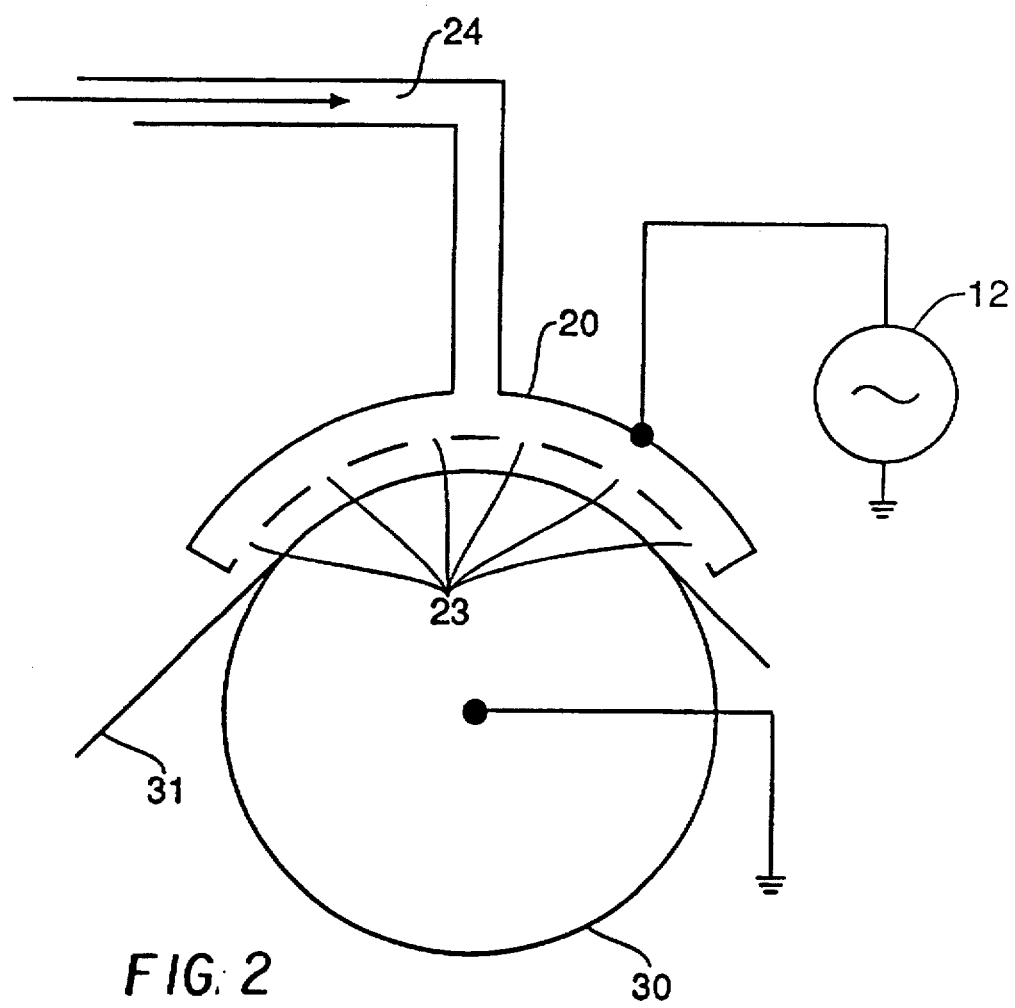
FIG. 2 shows an electrode configuration of the present invention for the continuous treatment of a moving web.

FIG. 2 shows a sectional view of the atmospheric glow discharge apparatus used in the present invention. Electrode 20 includes a series of apertures 23 through which the gas is supplied through inlet 24. The dimensions of electrode 20 are 12.1 cm by 13.3 cm. Electrode 20 has 333 apertures 23 each having a 1 mm diameter. The apertures are symmetrically distributed on the electrode 20. Surprisingly, it has been found that a stable glow discharge at atmospheric pressure with higher percentages of reactive gas species, most notably $N_2$ and $O_2$, is possible using the electrode 20 shown in FIG. 2. This allows for a faster and more complete treatment of the polyester substrate. The perforated electrode configuration shown in FIG. 2 can be operated in ambient air with a mixture of 8% $N_2$ in He being supplied through the apertures 23. Using the solid electrodes of FIG. 1 a stable discharge was not possible using the same gas mixture.

In order to demonstrate the improved adhesion properties of PET and PEN available from the apparatus and method of the present invention comparative adhesion tests were run between the solid electrodes of the prior art and the perforated electrode of the present invention.

After treatment, the substrates (PEN and PET) were coated with a black and white film emulsion. After the emulsion was set and dried a series of adhesion tape tests were run to test the adhesive properties of the treated PET and PEN.

Initially, the prior art electrodes of FIG. 1 were placed inside a vacuum vessel and the pressure was reduced to about 50 mTorr. The treatment gas was then introduced into the chamber. The total pressure for all the treatments was 0.79 atmospheres (600 torr). The treatment time was 120 seconds in all cases.

The table below shows the results of comparative adhesion tests done on a black and white emulsion coated on either polyethylene terephthalate (PET) or polyethylene naphthalate (PEN) after various treatments. To quantify the adhesion, three types of 3M Scotch™ brand tapes with increasing adhesive strengths are used. Test A uses Type 810, Test B uses Type 610 and Test C uses Type 396. The amount of emulsion removed was evaluated as a percentage of the area tested. Without any treatment, the emulsions fell off of the support.

TABLE 1

| Run No. | Support | Gas | Pressure Pct. Gas in He | Tape Test A | Tape Test B | Tape Test C |
|---|---|---|---|---|---|---|
| 1 | PET | Pure He | 0 | 95 | | |
| 2 | PET | $O_2$ | 1 | 50 | 10 | 80 |

TABLE 1-continued

| Run No. | Support | Gas | Pressure Pct. Gas in He | Tape Test A | Tape Test B | Tape Test C |
|---|---|---|---|---|---|---|
| 3 | PET | $N_2$ | 0.1 | 10 | 95 | |
| 4 | PEN | Pure He | 0 | 10 | 10 | 95 |
| 5 | PEN | $O_2$ | 1 | 0 | 0 | 0 |
| 6 | PEN | $N_2$ | 0.1 | 10 | 0 | 0 |

We see from this data that, while pure He discharges can produce some improvement in adhesion, particularly on PEN, addition of the reactive gas vastly improves the results for either material. However, operation below atmospheric pressure is disadvantageous from a manufacturing point of view because of the complexity of getting substrate material into and out of the low pressure zone.

The tape tests used to evaluate the effectiveness of the atmospheric glow discharge treatments on the PET and PEN using the present invention included application of a piece of Scotch™ brand adhesive tape to the dried emulsion coated substrate, and evaluating the results of peeling the tape from the sample. Five tests were used, each one successively more aggressive than the previous test. This sequence was achieved by changing the tape type, tape width, type of scoring tool, type of scoring, and tape peeling speed.

A black and white emulsion was coated on the PET and PEN substrates treated by the present invention in a 4 inch wide stripe down the 18 inch length of a 6 inch wide web sample. Either a high speed steel (HSS) tool bit or a dissection scalpel is used to scribe a scratch ½ inch in from each edge of the emulsion stripe. When patterns ("H" or "#") are used, the HSS bit or scalpel is used to form the pattern in the emulsion surface. A piece of the specific tape is then hand applied and pressed onto the prepared area. The length of the leader, or pull tab, is test specific to further control the peel force.

The tapes used include 810 (½ inch width), 610 (1 inch width), and 396 (¾ inch width). One of the tool bits may be used to slice the emulsion at the edge of the tape to concentrate the peel stresses to the area under the tape. Or, the peel forces can be spread out by not scribing the edges. In each case, the tape is then peeled such that the peel angle is 90 degrees between the tape and substrate. The speed of the peeling motion is another factor which affects the aggressiveness of the particular test. Two of the tests utilize multiple (3) peels to increase the aggressiveness.

A summary of the tests, in order of increasing aggressiveness, follows:

TABLE 2

| Tape Test | Tool | Pattern | Tape | Leader | Edge Slice | Speed | # of Peels |
|---|---|---|---|---|---|---|---|
| D | Scalpel | none | 810 | 0.25" | No | Slow | 1 |
| E | Scalpel | none | 810 | 0.25" | Yes | Fast | 1 |
| F | HHS Bit | H | 810 | 4" | Yes | Fast | 3 |
| G | Scalpel | # | 610 | 4" | Yes | Fast | 3 |
| H | Scalpel | # | 396 | 2" | Yes | Fast | 1 |

Referring to Table 1, Test E is similar to Test A, Test G is similar to Test B and Test H is similar to Test C. However, due to the peel speeds and scoring of the emulsion, Tests E, G and H are more aggressive than Tests A, B and C, respectively.

The amount of emulsion removed by the tape is recorded for each test as a percentage of the original bounded area under the tape.

A series of treatments was done on a small web system using the perforated electrode configuration as shown in FIG. 2. The tests were run at atmospheric pressure. The powered electrode 20 is anodized aluminum and is curved to conform to the transport drum 30 over which the web 31 passes. The electrode 20 is coupled to power supply 12. Once again, a black and white emulsion was coated onto the treated supports.

The table below shows the results of the tests for various treatments of PEN and PET. The numbers in the test columns show the amount of emulsion removed by each procedure. Without any treatment, the emulsions lift off of the supports by hand.

TABLE 3

| Run No. | Support | Gas | Flow Pct. Gas in He | Treatmt Time | Test D | Test E | Test F | Test G | Test H |
|---|---|---|---|---|---|---|---|---|---|
| 1 | PET | $N_2$ | 1.7 | 48 sec | 0 | 0 | 40 | 80 | 75 |
| 2 | PET | $N_2$ | 1.7 | 480 sec | 0 | 0 | 100 | | |
| 3 | PET | $N_2$ | 0.34 | 48 sec | 100 | 97 | 100 | 99 | 100 |
| 4 | PET | $N_2$ | 0.34 | 480 sec | 100 | 100 | 100 | 100 | 100 |
| 5 | PEN | $O_2$ | 0.5 | 48 sec | 0 | 20 | 85 | 85 | 95 |

Run numbers 1–4 demonstrate that for atmospheric pressure He/$N_2$ treatments of PET, regardless of the treatment time, higher percentages of reactive gas give improved adhesion. Run number 5 demonstrates that good results are possible with PEN support using an $O_2$ discharge. There is no evidence in these discharges of the streamers often associated with corona discharges, which can lead to non-uniform treatments. In comparing the results of Table 3 with the results of Table 1, it is also noted that a stable discharge using 1.7% $N_2$ in He at atmospheric pressure could not be achieved using the prior art electrodes.

While there has been shown and described what are at present considered the preferred embodiments of the present invention, it will be obvious to those skilled in the art the various changes, alterations and modifications may be made therein without departing from the scope of the invention as defined by the appended claims.

What is claimed is:

1. A method of treating a polymeric support comprising:

providing a first electrode having a first surface, the first electrode having a plurality of spaced apart holes adjoining the first surface, the first surface being insulated;

positioning a second electrode having a second surface spaced apart from the first surface of the first electrode;

pumping a gas through the plurality of holes wherein the gas is greater than or equal to atmospheric pressure, the gas comprising helium;

coupling a power supply to the first electrode having a frequency of 10.0 kH to 50 MHz;

positioning a web between the first surface of the first electrode as the second surface of the second electrode wherein the polymeric web is subjected to atmospheric glow discharge to improve the adhesive properties.

2. The method according to claim 1 wherein the frequency of the power supply is approximately 13.5 MHz.

3. The method according to claim 1 wherein the first electrode comprises aluminum.

4. The method according to claim 3 wherein the first surface is insulated by anodizing the aluminum.

5. The method according to claim 1 wherein the web comprises a polyester.

6. The method according to claim 1 wherein the web comprises a polyethylene coated paper.

7. The method according to claim 1 further comprising:

coating the web with a photographic emulsion after the web is subjected to the atmospheric glow discharge.

* * * * *